United States Patent
Song

(10) Patent No.: US 10,344,481 B2
(45) Date of Patent: Jul. 9, 2019

(54) SELF-CLEANING GUTTER SYSTEM

(71) Applicant: Daniel J. Song, Lexington, MA (US)

(72) Inventor: Daniel J. Song, Lexington, MA (US)

( * ) Notice: Subject to any disclaimer, the term of this patent is extended or adjusted under 35 U.S.C. 154(b) by 0 days.

(21) Appl. No.: 16/013,892

(22) Filed: Jun. 20, 2018

(65) Prior Publication Data

US 2019/0017274 A1 Jan. 17, 2019

Related U.S. Application Data

(60) Provisional application No. 62/533,599, filed on Jul. 17, 2017.

(51) Int. Cl.
*E04D 13/064* (2006.01)
*E04D 13/076* (2006.01)
*G05D 3/10* (2006.01)
*G01W 1/02* (2006.01)
*G01W 1/14* (2006.01)

(52) U.S. Cl.
CPC ....... *E04D 13/064* (2013.01); *E04D 13/0762* (2013.01); *G01W 1/02* (2013.01); *G01W 1/14* (2013.01); *G05D 3/10* (2013.01)

(58) Field of Classification Search
CPC . E04D 13/064; E04D 13/0648; E04D 13/076; E04D 13/0762; G01W 1/00; D01W 1/14; G05D 3/10
USPC .......... 52/1, 2.11, 2.13, 2.22, 11, 12, 15, 16; 248/48.1
See application file for complete search history.

(56) References Cited

U.S. PATENT DOCUMENTS

| | | | |
|---|---|---|---|
| 538,108 A | 4/1895 | Freeze | |
| 3,091,055 A | 5/1963 | Hegedusich | |
| 3,157,002 A * | 11/1964 | Herman | E04D 13/0645 210/158 |
| 4,072,285 A | 2/1978 | Greenwood | |
| 4,116,008 A | 9/1978 | Ward | |
| 4,226,057 A | 10/1980 | Wolcott | |
| 4,411,108 A | 10/1983 | Kerester | |
| 4,413,449 A | 11/1983 | Faye | |
| 4,561,616 A | 12/1985 | Robinson | |
| 4,634,312 A | 1/1987 | Sterzel | |
| 4,669,232 A | 6/1987 | Wyatt | |
| 4,696,131 A | 9/1987 | Schreffler | |
| 4,745,709 A * | 5/1988 | Johnson | E04D 13/076 52/11 |
| 4,837,987 A | 6/1989 | Fender | |
| 5,127,133 A | 7/1992 | Brucker | |
| 5,146,718 A | 9/1992 | Baskett | |
| 5,184,435 A | 2/1993 | Sherman | |
| 5,197,237 A | 3/1993 | Owens | |
| 5,274,965 A | 1/1994 | Jackson | |
| 5,317,843 A | 6/1994 | Sheehan | |
| 5,335,460 A | 8/1994 | Smith, Jr. | |
| 5,357,719 A | 10/1994 | Lewis | |
| 5,526,611 A | 6/1996 | Leahy | |

(Continued)

*Primary Examiner* — William V Gilbert

(57) ABSTRACT

The gutter consists of a gutter base, gutter flap, and pneumatic actuator. The actuator is controlled by a gutter controller which senses rain and controls the actuator. In rainy weather, a rain sensor at the gutter controller senses rain and pumps air into the actuator to raise the gutter flap to form a V-shaped gutter. In dry weather, when most of the debris is collected in the traditional gutter, the air is drained from the actuator and the gutter flap lies flat, letting the debris slide down to the ground.

18 Claims, 11 Drawing Sheets

(56) References Cited

U.S. PATENT DOCUMENTS

| | | | |
|---|---|---|---|
| 5,548,931 A | 8/1996 | Bryant | |
| 5,649,681 A | 7/1997 | Faye | |
| 5,746,027 A * | 5/1998 | Bonerb | E04D 13/0762 |
| | | | 52/1 |
| 5,802,774 A | 9/1998 | Kardacz | |
| 5,893,239 A | 4/1999 | Leahy | |
| 5,896,706 A | 4/1999 | Pike | |
| 5,989,357 A | 11/1999 | Vilhauer, Jr. et al. | |
| 6,240,679 B1 | 6/2001 | Smalara | |
| 6,668,491 B1 * | 12/2003 | Bonerb | E04D 13/076 |
| | | | 52/1 |
| 7,051,402 B1 | 5/2006 | Rigby | |
| 7,152,376 B2 | 12/2006 | Wyatt | |
| 7,428,799 B1 | 9/2008 | Frelier | |
| 7,581,356 B1 * | 9/2009 | Balkum | E04D 13/076 |
| | | | 52/11 |
| 7,891,141 B2 | 2/2011 | Kennedy | |
| 8,127,503 B2 * | 3/2012 | Kaiser | E04D 13/15 |
| | | | 52/11 |
| 8,141,302 B2 | 3/2012 | Desotell et al. | |
| 8,464,474 B2 | 6/2013 | Johnson | |
| 8,511,000 B2 | 8/2013 | Rees | |
| 8,650,809 B2 * | 2/2014 | Kaiser | E04D 13/00 |
| | | | 52/11 |
| 9,010,028 B2 | 4/2015 | Hutchings, Jr. | |
| 2003/0033756 A1 | 2/2003 | Adams | |
| 2009/0183438 A1 | 7/2009 | Walker | |
| 2011/0067319 A1 | 3/2011 | Anthony | |

* cited by examiner

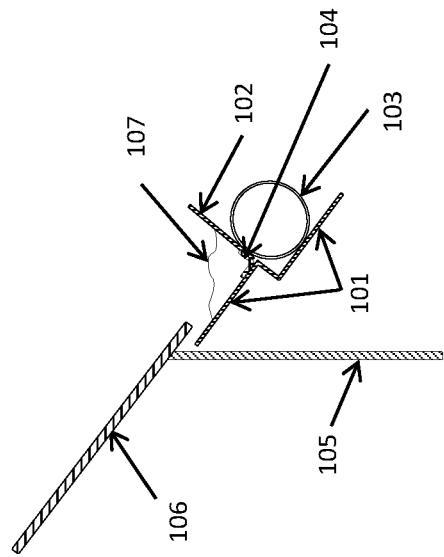
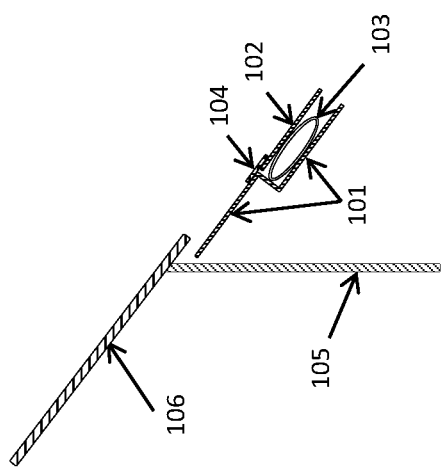
Fig. 4A
Fig. 4B

US 10,344,481 B2

SELF-CLEANING GUTTER SYSTEM

FIELD OF THE INVENTION

This invention relates generally to rain gutters, and more particularly, to self-cleaning gutters.

BACKGROUND

Gutters perform useful functions including protecting houses and foundations from water damage. However, many people are injured each year from ladder falls while cleaning gutters. In addition, having gutters professionally cleaned can be costly since gutters generally have to be cleaned multiple times a year.

There are many products available designed to keep the gutters from clogging up, but they all have their drawbacks. Gutter sponges and screens tend to clog up over time, and solid gutter covers let debris such as pine and fir needles in along with water through openings.

There are multiple types of previously-proposed self-cleaning gutters. Each type has its own problems and disadvantages. Consequently, none of these gutters seems to be available commercially today.

Perhaps the most popular type is the content dumping type. These gutters can be turned upside down and have its content fall to the ground when cleaning is needed. Some of them have hinges and some of them can be rotated. The turning and rotating mechanisms include levers and chains. Main disadvantages of these systems include the fact that gutters are generally long and turning and rotating from one end or even from the middle would make long gutters twist significantly. In order to prevent twisting, gutters would have to be made quite stiff requiring significantly more material and manufacturing cost. In addition, these turning and rotating mechanisms can be quite complex thus can be costly and unreliable.

Other types include built-in cleaning tools such as coils and water-jets. However, each type has its own issues such as clogging and limited effectiveness. None of these systems seems to be commercially available, indicating that reliable and cost-effective implementations are likely not available.

SUMMARY

The invention described herein is a gutter system designed to be completely self-cleaning without the drawbacks of previously-proposed self-cleaning gutters. The gutter system described herein is also designed to be highly cost-effective in manufacturing, installation, and maintenance.

In one embodiment, a self-cleaning gutter system comprises a gutter base having an upper surface and a lower surface. The upper surface slopes downward away from a roof of a house when the gutter base is mounted to a side of the house. A gutter flap is coupled to the upper surface of the gutter base by a hinge. The gutter flap is rotatable about the hinge between a first position wherein the gutter flap slopes upward away from the roof of the house to form substantially a v-shaped channel with respect to the upper surface of the gutter base and a second position wherein the gutter flap slopes downward away from the roof of the house to become substantially planar with the upper surface of the gutter base. An inflatable pneumatic gutter flap actuator is disposed between the gutter flap and the lower surface of the gutter base. A gutter controller is configured to inflate and deflate the inflatable pneumatic gutter flap actuator and thereby cause the gutter flap to move between the first and second positions.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

FIG. 4A is a drawing illustrating a side view of an embodiment of the self-cleaning gutter mounted on the outer wall of a house underneath the edge of the roof with the gutter flap in down position sloping downward away from the house. In this embodiment, the gutter hinge comprises a strip of flexible material attached to both gutter base and gutter flap.

FIG. 4B is a drawing illustrating a side view of an embodiment of the self-cleaning gutter mounted on the outer wall of a house underneath the edge of the roof with the gutter flap in up position sloping upward away from the house. In this embodiment, the gutter hinge comprises a strip of flexible material attached to both gutter base and gutter flap.

DETAILED DESCRIPTION

Figure 1:
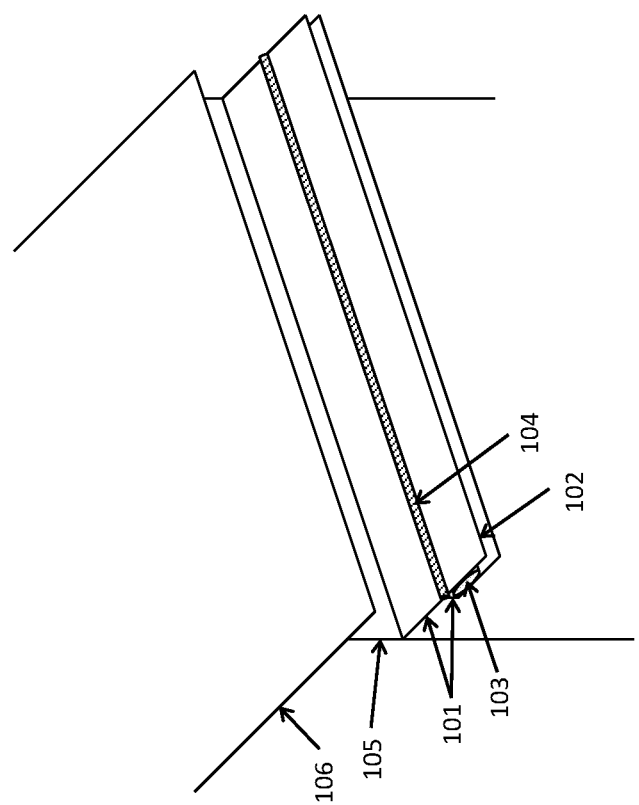
FIG. 1 is an elevated view of a roof overhanging a gutter system. The drawing illustrating an embodiment of the self-cleaning gutter mounted on the outer wall of a house underneath the edge of the roof with the gutter flap in down position sloping downward away from the house.
Figure 3B:
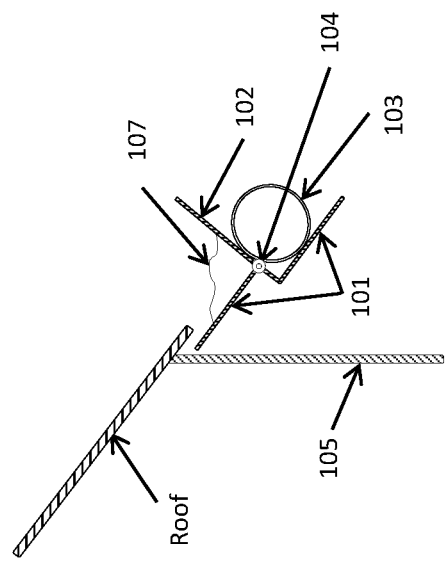
FIG. 3B is a drawing illustrating a side view of an embodiment of the self-cleaning gutter mounted on the outer wall of a house underneath the edge of the roof with the gutter flap in up position sloping upward away from the house.
Figure 3A:
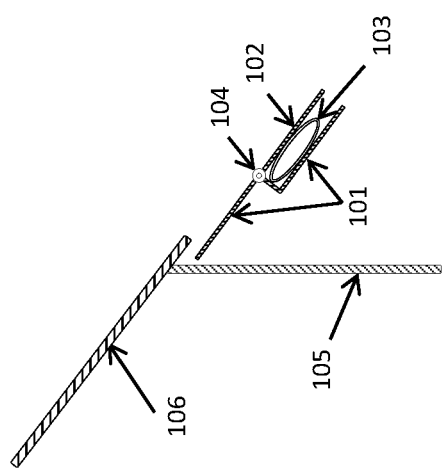
FIG. 3A is a drawing illustrating a side view of an embodiment of the self-cleaning gutter mounted on the outer wall of a house underneath the edge of the roof with the gutter flap in down position sloping downward away from the house.

The self-cleaning gutter system in dry-weather configuration is shown in FIG. 1 and the cross section diagram is shown in FIG. 3A. The gutter comprises the gutter base 101, the gutter flap 102, and the pneumatic actuator 103. The gutter flap 102 is attached to the gutter base 101 with a hinge 104, and is moved by the inflatable pneumatic actuator 103. The gutter is mounted on the exterior wall 105 of the house and underneath the edge of the roof 106. The gutter changes its shape depending on the weather. In dry weather, when most of the leaves, needles, and other debris tend to collect in conventional gutters, the gutter flap 102 is in down position with the pneumatic actuator 103 deflated. In this mode, the gutter has a flat shape, and looks like an extension of the roof line as shown in FIG. 1 and FIG. 3A. All the leaves, needles, and debris slide off the gutter to the ground. Since the gutter surfaces including the base 101 and the flap 102 can be made of smooth material such as aluminum or plastic, they are much smoother and slipperier than most roof 106 surfaces such as asphalt. Thus debris slides off the gutter even easier than roof 106 surfaces and do not accumulate.

Figure 2:
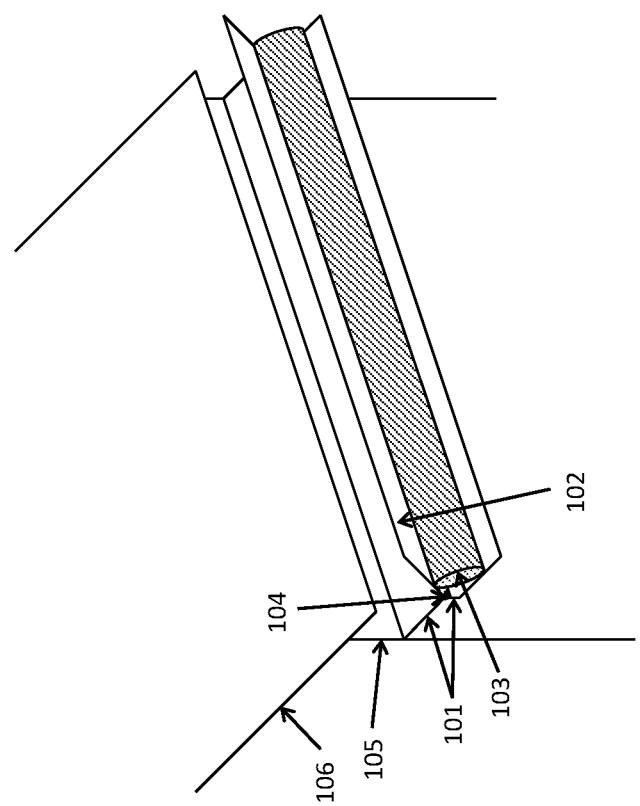
FIG. 2 is a drawing illustrating an embodiment of the self-cleaning gutter mounted on the outer wall of a house underneath the edge of the roof with the gutter flap in up position sloping upward away from the house.

In rainy weather, the gutter flap 102 is flipped up by inflating the pneumatic actuator 103 to form a V-shaped gutter as shown in FIG. 2 and FIG. 3B, and rain water 107 moves down the gutter similarly as in traditional gutters. Deflating the pneumatic actuator 103 puts the flap 102 down for dry weather operation.

In one embodiment, the gutter base 101 has a stepped shape so that the top flat surface of the gutter base 101 that is closest to the house would lie in the same plane as the top surface of the gutter flap 102 when the gutter flap 102 is in down position as shown in FIG. 1 and FIG. 3A. The stepped shape of the gutter base 101 provides the room necessary for the gutter actuator 103 to be situated underneath the gutter flap 102.

FIGS. 4A and 4B show the same cross sectional view as FIGS. 3A and 3B except the hinge 104 is implemented with a strip of flexible material attached to both gutter base 101 and gutter flap 102 for low-cost high-reliability implementation of the hinge that is also leak proof.

Figure 5:
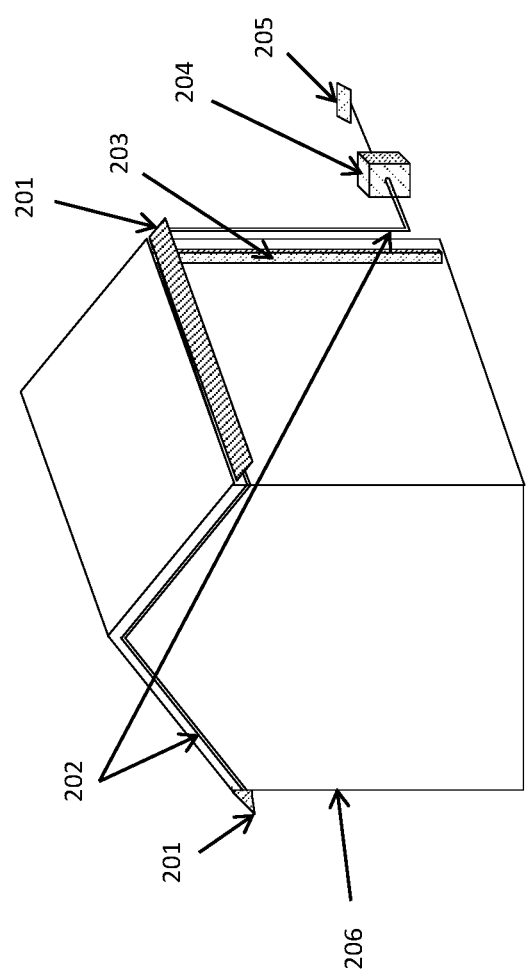
FIG. 5 is a drawing illustrating an embodiment of the self-cleaning gutter system and illustrating how multiple self-cleaning gutters can be mounted on a house with downspouts and be controlled by a controller which is attached to a rain sensor.

FIG. 5 shows how the controller 204 can control multiple gutters 201 on a house 206. The inflatable pneumatic actuators 103 of multiple gutters 201 on a house 206 can be connected together with thin air hoses 202 and can be connected to the controller 204 which contains an air pump to pump up the pneumatic actuators. The controller 204 is also attached to a rain sensor 205 to detect rain. When it rains, the air pump is turned on and inflates the pneumatic actuators 103 to flip up the gutter flaps 102 to form the V-shaped gutters. When the rain stops, the pneumatic actuator is deflated to put the gutter flap 102 down. The pneumatic actuator 103 can be deflated by sucking the air out with a pump or by letting the air out naturally as the weight the gutter flap 102 compresses the pneumatic actuator 103 naturally. Each self-cleaning gutter has one or more downspouts 203 attached to it.

The controller 204 can also be equipped with a microprocessor with a wired or wireless connection to the internet so that the gutter flap 102 can be optimally controlled with up-to-date on-line local weather information and local weather forecast as well as the rain sensor 205 output. Other weather information such as temperature, wind, and humidity information can also be sensed or provided from internet, and can be used to control the gutter flap 102. For example, in the winter when there is snow on the roof, it may be desirable to put the flap down in order to prevent formation of ice dams which can damage the house. Although shown in FIG. 5 to be external to the house 206, it is to be understood that the controller 204 can reside inside. The controller 204 can also support a manual mode in which a user can inflate or deflate the pneumatic actuators 103 manually. Such manual mode can be implemented by adding appropriate controls on the controller 204 and also by providing ways to remotely control the controller 204.

It is possible that the debris from the roof can be carried down into the gutter by the rain. However, the debris collected in the gutter will dry up and fall off the gutter in dry weather when the gutter flap 102 is down.

Figure 6:
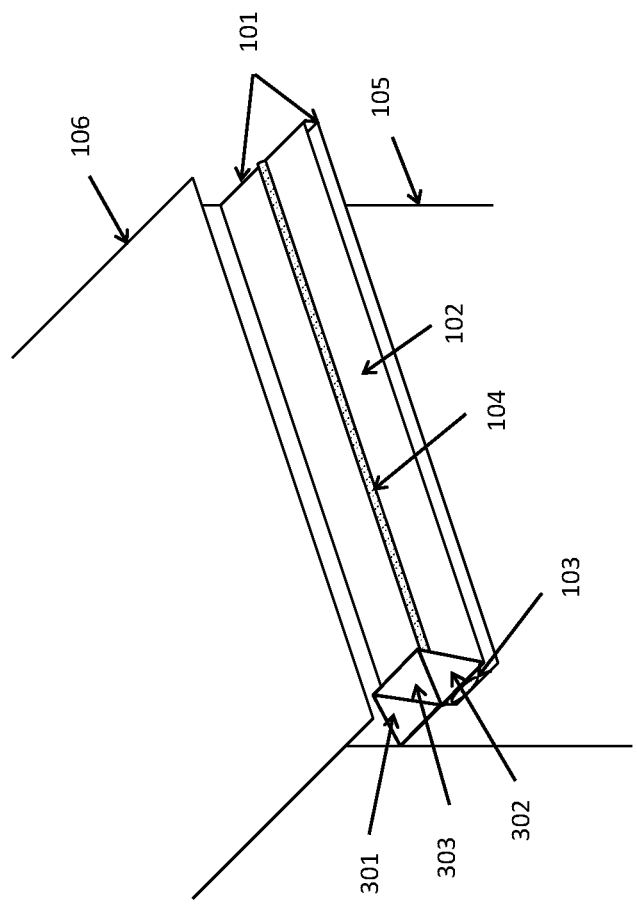
FIG. 6 is a drawing illustrating an embodiment of an end cap design of the self-cleaning gutter that has to accommodate the flap going up and down as weather changes. This illustration shows an end cap when the gutter flap is in down position.
Figure 7:
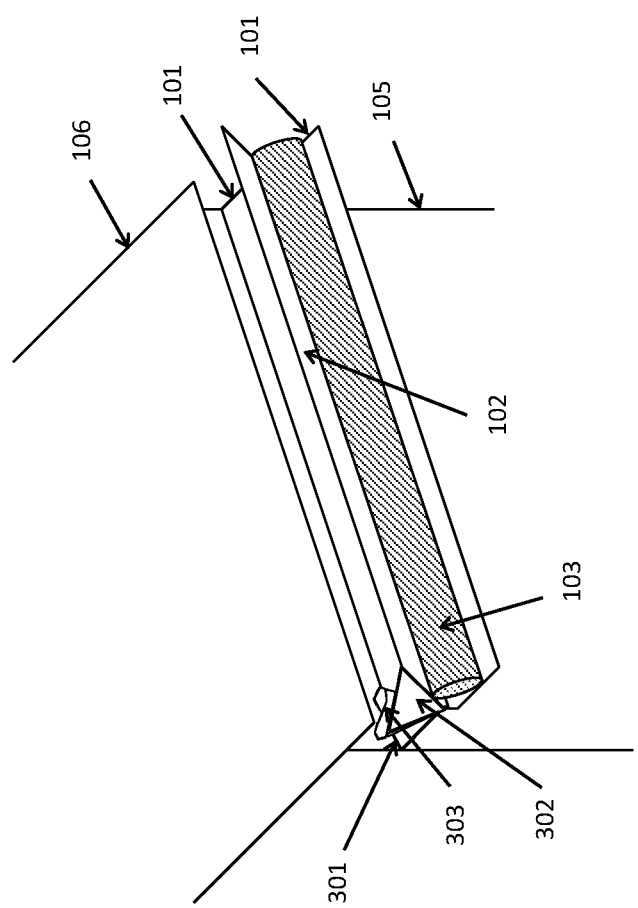
FIG. 7 is a drawing illustrating an embodiment of an end cap design of the self-cleaning gutter that has to accommodate the flap going up and down as weather changes. This illustration shows an end cap when the gutter flap is in up position.
Figure 8B:
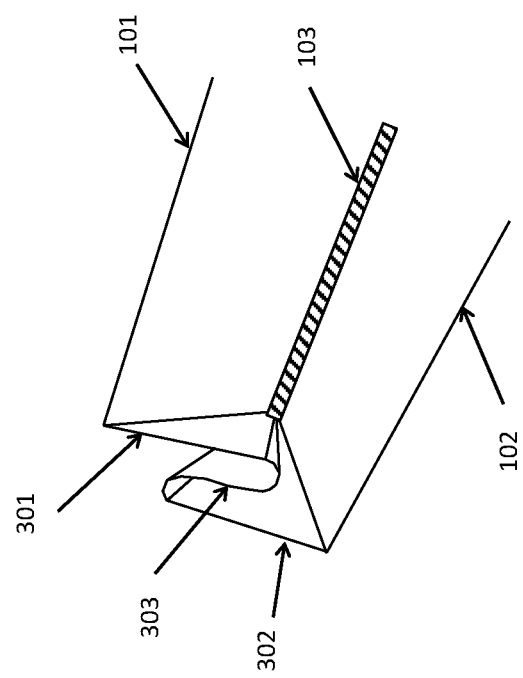
FIG. 8B is a drawing from another view point illustrating an embodiment of an end cap design of the self-cleaning gutter that has to accommodate the flap going up and down as weather changes. This illustration shows an end cap when the gutter flap is in up position.
Figure 8A:
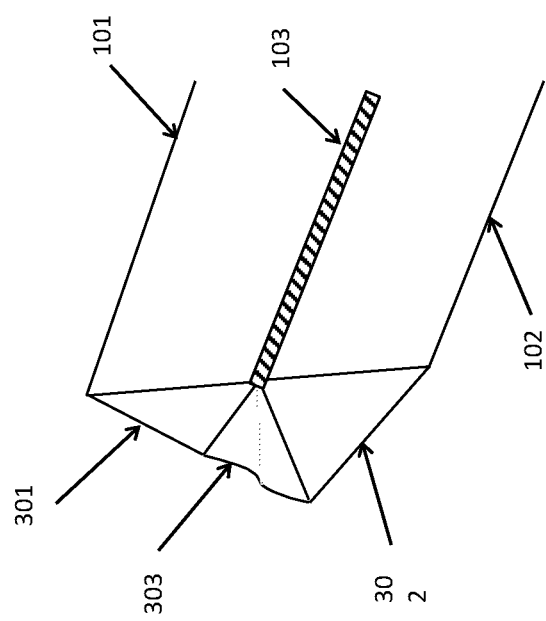
FIG. 8A is a drawing from another view point illustrating an embodiment of an end cap design of the self-cleaning gutter that has to accommodate the flap going up and down as weather changes. This illustration shows an end cap when the gutter flap is in down position.

For the ends of the gutter, the end cap design has to accommodate the flap 102 going up and down as the weather changes. FIG. 6, FIG. 7, FIG. 8A, and FIG. 8B show an end cap design that can accommodate the gutter flap's 102 motion between up position and down position and still be able to keep the rain water 107 in the gutter in when the gutter flap 102 is in up position. FIG. 6 shows how such gutter end cap can be implemented using a sidewall 301 attached to the gutter base 101, another sidewall 302 attached to the gutter flap 102, and a sheet of flexible material 303 between two sidewalls 301 and 302. FIG. 8A shows the same design from another viewing angle. When the gutter flap 102 is down, both sidewalls 301 and 302 as well as the flexible sheet 303 are in approximately in-line vertical positions. When the gutter flap 102 is in the up position as shown in FIG. 7, the sidewalls 301 and 302 overlap and the flexible sheet 303 folds to accommodate the flipping up motion of the gutter flap 102. FIG. 8B shows this from another viewing angle. The sidewalls 301 and 302 are attached in slightly different angles to the gutter base 101 and the gutter flap 102 so that the sidewalls 301 and 302 would overlap without touching each other. The sidewalls 301 and 302 and the flexible sheet 303 work together to contain the rain water 107 within the V-shaped gutter.

Figure 9:
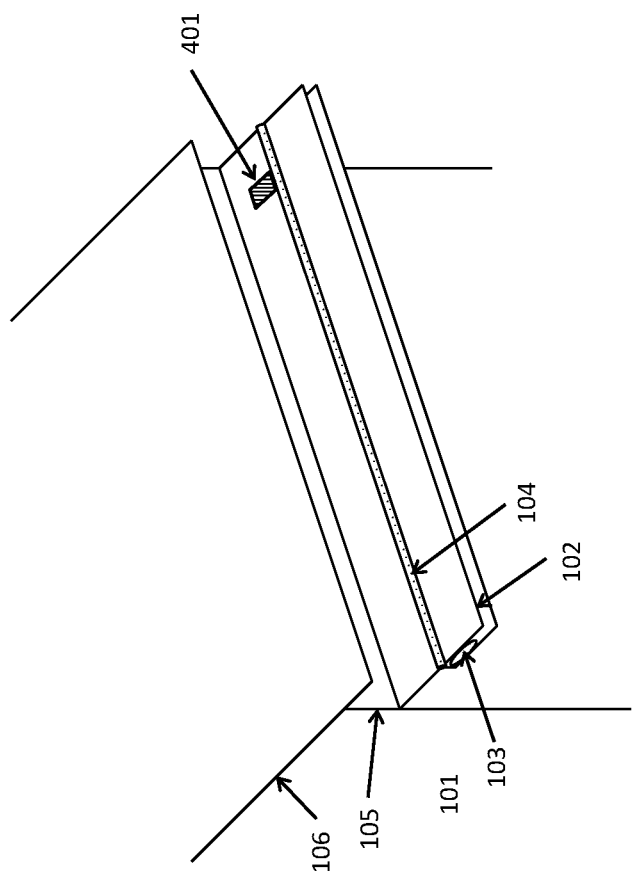
FIG. 9 is a drawing illustrating an embodiment of a self-cleaning gutter with a hole for a downspout.

For the downspout, it is difficult to make a hole in the moving gutter flap 102. Therefore, the hole 401 for the downspout can be made in the gutter base only 101 as shown in FIG. 9.

Figure 10:
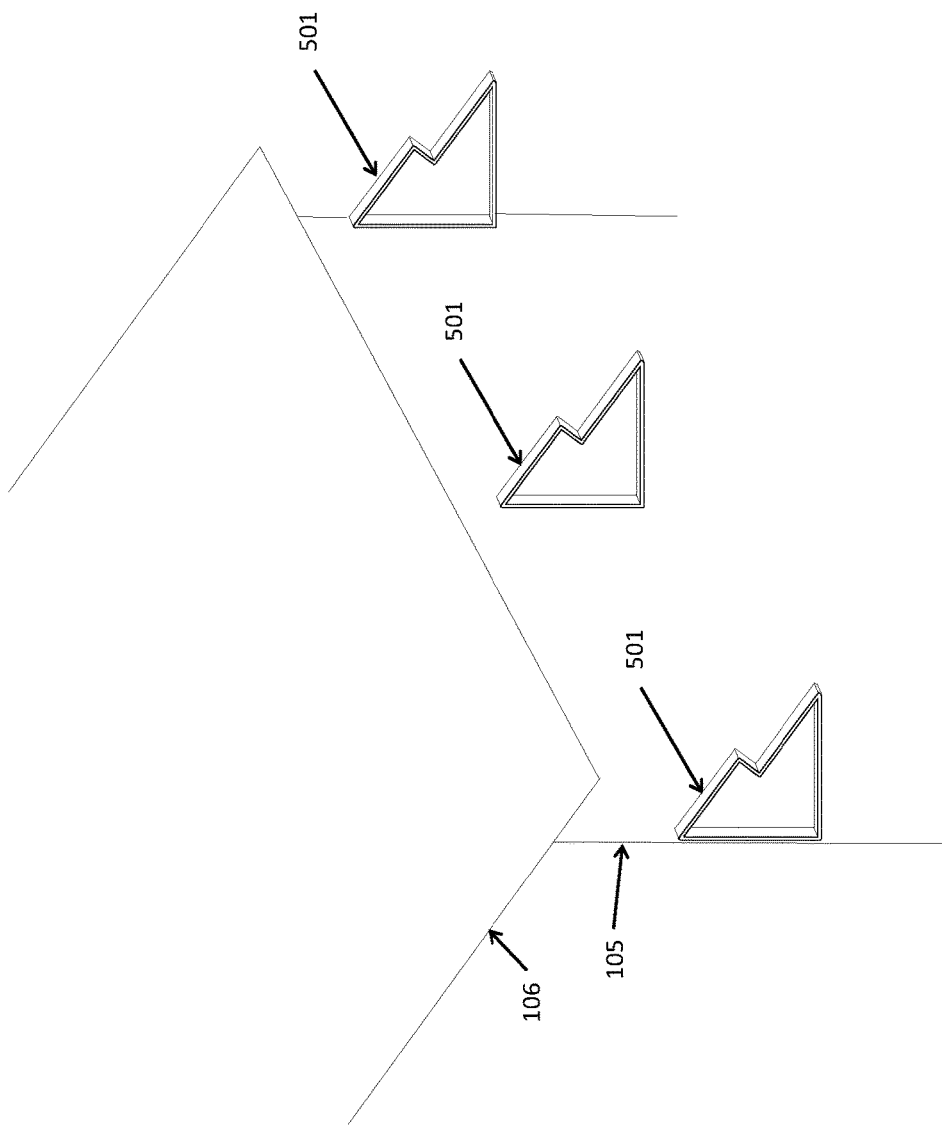
FIG. 10 is a drawing illustrating an example embodiment of the mounting brackets for the self-cleaning gutter. The brackets are mounted on an exterior wall of a house so that the self-cleaning gutter can be mounted on to the brackets.

The gutter base 101 can be attached to the house 105 using low-cost brackets 501 shown in FIG. 10. The bracket 501 is attached to both the house outer wall 105 and the gutter base 101. The surface of the bracket 501 that supports the gutter base 101 has a stepped shape complementary to the stepped shape of the gutter base 101.

Figure 11:
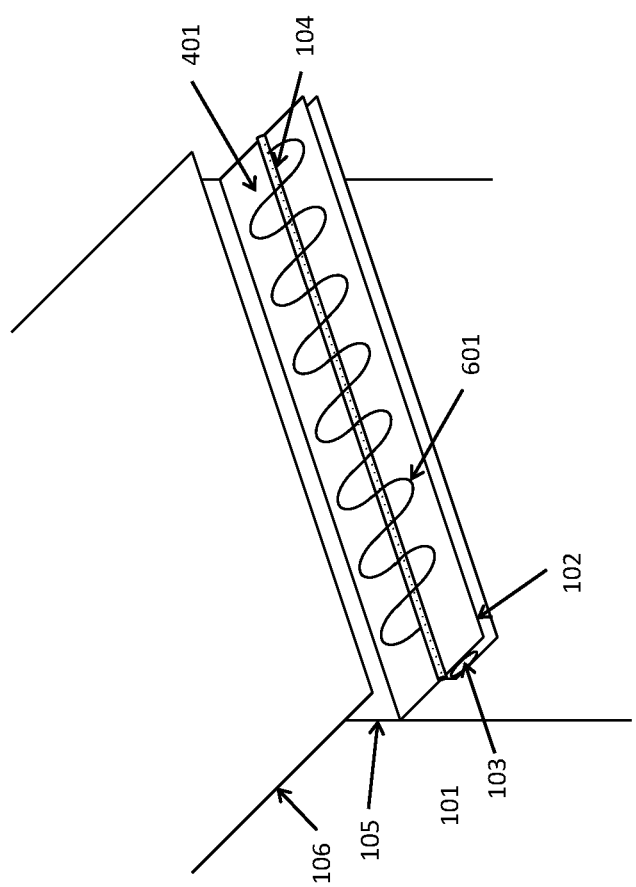
FIG. 11 is a drawing illustrating an embodiment of a self-cleaning gutter with a heating coil to prevent freezing and ice dams.

It is also possible to put heating coils 601 on the self-cleaning gutter as shown in FIG. 11 to prevent freezing and ice dams. Other types of heating elements other than the heating coils can also be used, such as heating elements used for rear window defogger in automobiles. The heating element can also be controlled by the controller. The heating coils or elements can also be mounted on the underside of the gutter base 101 and gutter flap 102 to keep the top surfaces of the gutter smooth.

The self-cleaning gutter system can be made with low-cost materials such as aluminum or plastic for gutter base 101 and gutter flap 102, and weather-and-ultra-violet-ray-resistant rubber or silicone for gutter hinge 104 and pneumatic actuator 103. The simple design should result in high-reliability and low-cost operation with high durability.

To summarize, the automatic self-cleaning gutter system does not collect leaves, needles, or debris in dry weather yet functions in the same way as a normal gutter in rainy weather. In dry weather mode with the flap down, debris easily slides off the gutter surfaces. When rain is detected by the rain sensor, the flap automatically goes up and the gutter functions as a normal V-shaped gutter that can readily handle heavy rainfall. The gutter system can be made highly reliable, manufacturable, and cost effective due to its simple design utilizing low-cost components. Implementation of the gutter system is expected to result in significant savings in gutter cleaning costs as well as prevention of injuries and deaths associated with gutter cleaning.

While the principles have been described herein in conjunction with a number of embodiments, it is evident that many alternatives, modifications, and variations would be or are apparent to those of ordinary skill in the applicable arts. References to "one embodiment" or "an embodiment" or "another embodiment" means that a particular, feature, structure or characteristic described in connection with the embodiment is included in at least one embodiment described herein. References to an embodiment within the specification do not necessarily all refer to the same embodiment. The features illustrated or described in connection with one embodiment may be combined with the features of other embodiments. Accordingly, it is intended to embrace all such alternatives, modifications, equivalents, and variations that are within the spirit and scope of the principles described herein.

I claim:

1. A self-cleaning gutter system comprising:
   a gutter base having an upper surface and a lower surface, the upper surface sloping downward away from a roof of a house when the gutter base is mounted to a side of the house;
   a gutter flap coupled to the upper surface of the gutter base by a hinge, the gutter flap being rotatable about the hinge between a first position, wherein the gutter flap slopes upward away from the roof of the house when the gutter base is mounted to the side of the house to form substantially a v-shaped channel with respect to the upper surface of the gutter base, and a second position, wherein the gutter flap slopes downward away from the roof of the house when the gutter base is mounted to the side of the house to become substantially co-planar with the upper surface of the gutter base;
   an inflatable pneumatic gutter flap actuator disposed between the gutter flap and the lower surface of the gutter base; and
   a gutter controller configured to inflate and deflate the inflatable pneumatic gutter flap actuator and thereby cause the gutter flap to move between the first and second positions.

2. The self-cleaning gutter system of claim 1, wherein the gutter controller is further configured to acquire weather information and determine whether to inflate or deflate the pneumatic gutter flap actuator based on the acquired weather information.

3. The self-cleaning gutter system of claim 2, further comprising one or more rain sensors in communication with the gutter controller, the one or more rain sensors acquiring information regarding rain and providing the information regarding rain to the gutter controller.

4. The self-cleaning gutter system of claim 2, further comprising one or more temperature sensors in communication with the gutter controller, the one or more temperature sensors acquiring information regarding temperature and providing the information regarding temperature to the gutter controller.

5. The self-cleaning gutter system of claim 2, further comprising one or more wind sensors in communication with the gutter controller, the one or more wind sensors acquiring information regarding wind and providing the information regarding wind to the gutter controller.

6. The self-cleaning gutter system of claim 2, further comprising one or more humidity sensors in communication with the gutter controller, the one or more humidity sensors acquiring information regarding humidity and providing the information regarding humidity to the gutter controller.

7. The self-cleaning gutter system of claim 2, wherein the gutter controller includes a processor and has a communication connection to the internet from which the gutter controller can acquire the weather information.

8. The self-cleaning gutter system of claim 1 wherein the hinge comprises a strip of flexible material attached to the upper surface of the gutter base and the gutter flap.

9. The self-cleaning gutter system of claim 1, further comprising one or more brackets, complementary in shape to the gutter base, that attach the gutter base to a side wall of the house.

10. The self-cleaning gutter system of claim 1, wherein the upper surface of the gutter base has one or more holes for one or more downspouts.

11. The self-cleaning gutter system of claim 1, further comprising an endcap to close off an end of the v-shaped channel that forms when the gutter flap is in the first position, the endcap comprising:
    a first side wall attached to the upper surface of the gutter base;
    a second side wall attached to the gutter flap;
    a flexible sidewall attached to the first and second sidewalls.

12. The self-cleaning gutter system of claim 1, wherein the gutter controller is further configured to inflate or deflate the pneumatic gutter flap actuator under manual control.

13. The self-cleaning gutter system of claim 1, further comprising a heating element coupled to the upper surface of the gutter base to prevent water from freezing and ice dam formation.

14. The self-cleaning gutter system of claim 1, wherein the controller includes a pump for pumping gas into the inflatable pneumatic gutter flap actuator.

15. The self-cleaning gutter system of claim 14, wherein the pump can draw gas from the inflatable pneumatic gutter flap actuator when the inflatable pneumatic gutter flap actuator is deflated.

16. The self-cleaning gutter system of claim 14, wherein the gutter controller allows gas to come out the inflatable pneumatic gutter flap actuator naturally as the weight of the gutter flap compresses the pneumatic gutter flap actuator.

17. The self-cleaning gutter system of claim 1, wherein the gutter base is a first gutter base and the pneumatic gutter flap actuator is a first pneumatic gutter flap actuator, and further comprising a second gutter base and second pneumatic gutter flap actuator mounted to the house separate from the first gutter base and the first pneumatic gutter flap actuator, and wherein the first and second pneumatic gutter flap actuators are connected by one or more hoses and connected to the gutter controller by one or more hoses.

18. The self-cleaning gutter system of claim 1, wherein the gutter base has a stepped shape.

\* \* \* \* \*